No. 789,607.

Patented May 9, 1905.

UNITED STATES PATENT OFFICE.

LUDWIG GROTE, OF LONDON, ENGLAND, ASSIGNOR OF TWO-THIRDS TO EDWIN PERRY AND RALPH WALTON PERRY, OF LONDON, ENGLAND.

BINDING MATERIAL AND PROCESS OF MAKING SAME.

SPECIFICATION forming part of Letters Patent No. 789,607, dated May 9, 1905.

Application filed October 1, 1904. Serial No. 227,134.

*To all whom it may concern:*

Be it known that I, LUDWIG GROTE, engineer, a subject of the German Emperor, residing at 177 Garrick Villas, Mount Pleasant Road, Tottenham, London, England, have invented certain new and useful Improvements in Binding Material and Processes of Making the Same, of which the following is a specification.

The present invention relates to the manufacture of binding material for use in the production of molded articles or for other purposes, and primarily has for its object the production of a binding material which when combined with the desired filling material has the advantage that same can be made as an insulating material for electrical purposes or fireproof or waterproof and which composition after being molded and pressed into the desired shape or form will not (appreciably) change in volume or form or shape and may be employed for any purpose for which same is or may be applicable.

It is known that the materials hitherto used or attempted to be used for such purposes as insulating bodies for electrical purposes when made of glass or porcelain and other kinds of clays are attended by numerous disadvantages. For example, the shrinking and the contraction of the articles while being baked or treated in the process of manufacture (in the kiln, &c.) involves difficulties, and consequently prevents the production of accurate work, such as is desirable, especially for electrical purposes, &c. Furthermore, in the case of electric currents of high tension and of changes of temperature these aforesaid insulating-bodies break or crack very easily and have numerous drawbacks. Insulating-bodies made of hard rubber or celluloid and the like, owing to the great danger of fire, cannot be employed in all cases. The present invention is designed to avoid these drawbacks and has many advantages and is as follows: Chlorinated lime is mixed with distilled or rain water and the mixture allowed to stand for awhile, and then the liquid is filtered or passed through a sieve, and such liquid is then treated by sulfate of magnesia. After the sulfate of lime (calcium sulfate) has been separated as thoroughly as possible the liquid so obtained—*i. e.*, solution of hypochlorite of magnesium—is filtered and then concentrated—for example, by boiling to, say, a strength of about 20° to 40° Baumé. I prefer to use the hypochlorite of magnesium obtained as described above; but of course it may be obtained in any suitable manner. The liquid thus produced, as above described, has then mixed with it vegetable gum, advantageously tragacanth, in a finely-divided condition. For example, ten parts, by weight, of tragacanth or other suitable vegetable gum may be mixed with, say, two hundred parts, by weight, of the aforesaid liquid. After having carefully mixed these components the resulting composition (solution) is allowed to stand, (for, say, twelve to twenty-four hours,) so as to obtain a thick glue-like or gelatinous mass or body. Now in order to obtain a close combination, which is necessary for binding pulverizable bodies, the solution is advantageously driven through sieves of coarse and then fine meshes by means of a hard brush, and this continues until a thick slimy and milky substance has formed. The gelatinous mass produced as above has mixed therewith an alkaline silicate, preferably a double silicate consisting of silicate of sodium and silicate of potassium. For example, ten to twenty-five parts, by weight, of such double silicate at 10° to 20° Baumé may be mixed with two hundred and ten parts, by weight, of said gelatinous mass. According to the object and nature of the articles to be produced or results desired to be obtained a stronger or weaker solution of double silicate may be employed. For example, I may advantageously use a double silicate of equal parts, by weight, of sodic silicate of, say, 40° Baumé and potassic silicate of, say, 40° Baumé. After the whole mass has been very carefully worked it is then (either alone or mixed with a small percentage of the filling material, such as hereinafter specified) passed through a fine grinding-mill, from which it emerges in a cream-like form or thoroughly smooth and even consistence, forming a homogeneous mass or body, and there is thus produced according to this invention a binding material which can then at once be used or kept for future use, such material (binding material) being suitable for making insulating articles and numerous other articles of various kinds from plastic composition as follows: As filling material or the material to be used in conjunction with said binding material it is advantageous to use fire-resisting substances in a pulverized form provided they be free from metallic ingredients. For example, I may employ chalk, lime, carbonate of barium, soapstone powder, kaolin, magnesite, light magnesia, barytes, clays, white bolus, (pipe-clay,) slate, (slate-powder,) quartz-powder, coke, coal-dust, &c., or any suitable combination of any of these substances, or in substitution for or in addition to the aforesaid materials I may employ any other organic or inorganic material suitable for use with the aforesaid binding material according to the present invention. For example, mineral, vegetable, or animal oils or fats may be employed prepared in any suitable way.

The binding material according to this present invention may be used in any suitable proportion with the filling material or materials according to the nature of the latter. For example, there may be employed one part, by weight, of the binding materials hereinbefore described with one to ten parts, by weight, of the aforesaid filling materials.

The mixing of the binding material and the filling material may be accomplished in any suitable mixer, such as a kneading-machine of the type known as "Werner-Pfleiderer" mixing-machine. After having thoroughly mixed the filling material and binding material together, so as to obtain an intimate and even mixture thereof, the whole may be passed through a suitable sieve. The plastic compound thus produced is now ready for molding, rolling, beating, or compressing, or otherwise forming into the desired article or shape.

If desired, the aforesaid gelatinous mass may be employed in any other manner or for any other purposes to which same may be applicable.

By the action of vegetable gums—such as tragacanth, gum-gutta, kutera gum, and the like—on magnesium hypochlorite and by adding an alkaline double silicate, and, if desired, filling substances a non-hygroscopic binding material for binding pulverizable substances is obtained. The combined action of the hypochlorite and the alkaline silicate oxidize the vegetable gum, and the resulting product forms a highly efficient binding material.

An especial object of the present process is to obtain a binding material which is inodorous and may be manufactured by the cold way, which does not delay the binding of the pulverizable bodies, assumes a horn-like structure, and does not diminish, but, if anything, increases the elasticity of the filling substances.

What I claim is—

1. The process of manufacturing a non-hygroscopic binding material which consists in mixing a hypochlorite with vegetable gum and then adding an alkaline silicate, substantially as described.

2. The process of manufacturing a non-hygroscopic binding material which consists in mixing magnesium hypochlorite with tragacanth and then adding an alkaline silicate, substantially as described.

3. As a new article of manufacture, a non-hygroscopic material composed of an alkaline hydrate, an oxidized vegetable gum, and an alkaline silicate, substantially as described.

4. As a new article of manufacture, a non-hygroscopic binding material comprising magnesium hydrate, oxidized gum-tragacanth, and an alkaline silicate, substantially as described.

5. As a new article of manufacture, a non-hygroscopic binding material formed by mixing together magnesium hypochlorite, vegetable gum and an alkaline silicate, substantially as described.

6. As a new article of manufacture a non-hygroscopic binding material formed by mixing together magnesium hypochlorite, gum-tragacanth and an alkaline silicate, substantially as described.

In witness whereof I have hereunto set my hand in presence of two witnesses.

LUDWIG GROTE.

Witnesses:
  HENRY BIRKBEET,
  FRANCIS W. FRIGOUT.